United States Patent
Lu et al.

(10) Patent No.: US 7,583,061 B2
(45) Date of Patent: Sep. 1, 2009

(54) CHARGER CIRCUIT AND PWM CONTROLLER THEREOF

(75) Inventors: Shu-Zhuang Lu, Shanghai (CN); Tao Peng, Shanghai (CN)

(73) Assignee: BCD Semiconductor Manufacturing Limited, George Town, Grand Cayman ( * ) Notice: Subject to any disclaimer, the term of this patent is extended or adjusted under 35 U.S.C. 154(b) by 201 days.

(21) Appl. No.: 11/648,806

(22) Filed: Jan. 3, 2007

(65) Prior Publication Data

US 2008/0007226 A1    Jan. 10, 2008

(30) Foreign Application Priority Data

Jun. 16, 2006 (CN) .................... 2006 2 0121243 U

(51) Int. Cl.
  *H01M 10/46* (2006.01)
(52) U.S. Cl. .................................................... 320/141
(58) Field of Classification Search ................. 320/107, 320/114, 141
  See application file for complete search history.

(56) References Cited

U.S. PATENT DOCUMENTS 5,872,443 A * 2/1999 Williamson ................. 320/160
6,301,132 B1 * 10/2001 Vandelac ................. 363/56.01

* cited by examiner

*Primary Examiner*—Edward Tso
(74) *Attorney, Agent, or Firm*—Muncy, Geissler, Olds & Lowe, PLLC

(57) ABSTRACT

A PWM controller includes a short circuit mode circuit which has input ends connecting simultaneously to a power supply input end and an output end of an output driving circuit, and an oscillator which has a temperature compensation circuit that includes a medium value multi-transistor resistor of a negative temperature coefficient and a well resistor of a positive temperature coefficient. The invention also provides a charger circuit which includes the PWM controller set forth above and a constant voltage/current control circuit coupling with the PWM controller through a transformer. A system adopting the PWM controller circuit and charger circuit of the invention does not need a voltage stabilization diode now equipped in many conventional designs. The invention provides an improved short circuit protection and eliminates low frequency harmonic waves.

9 Claims, 6 Drawing Sheets

CHARGER CIRCUIT AND PWM CONTROLLER THEREOF

FIELD OF THE INVENTION

The present invention relates to pulse width modulation (PWM) and particularly to a lower power PWM control technique related to charger circuits and PWM controllers thereof.

BACKGROUND OF THE INVENTION

At present the chargers for handsets and digital cameras mostly adopt a switch power supply circuit. They are designed for a lower power supply and can be classified as follow: a first type in which the circuit on the primary side of a transformer adopts RCC separated elements to form self actuation control or a PWM controller to form external actuation control; a second type in which the secondary side of a transformer adopts a dual operational charge circuit to achieve constant current and a voltage base circuit to achieve constant voltage, or adopts a voltage base circuit to achieve constant voltage and a transistor to achieve constant current; and a third type which adopts an ASIC (application specific integrated circuit) design which has a dedicated integrated circuit on the primary side of a transformer to control output at constant voltage and constant current without an optical coupler and a constant voltage/current controller on the secondary side of the transformer.

The first type is simpler, but has notable disadvantages, such as greater element dispersion, lower efficiency, no short circuit function, lower production yield, thus the acceptance is dwindling now. The third type that adopts the ASIC design is simpler, but it requires a special technology available only to a small number of manufacturers. Moreover, it does not provide a vigorous voltage/current control circuit, hence system harmonic wave and noise performances are less desirable, and the cost also is higher, thus it still cannot fully meet customers' requirements. The second type is most widely adopted. Its system performance can meet the constant voltage/current requirement of most high performance chargers. Environmental temperature variation also does not have significant impact on the system performance. However, it also has its share of problems, such as system cost is higher and circuit board area is greater.

To overcome the aforesaid problems, a higher performance solution is needed to provide a higher efficiency, improved short circuit characteristics, and lower system output harmonic wave and system cost.

SUMMARY OF THE INVENTION

The primary object of the present invention is to provide a high performance charger circuit that has a higher efficiency, improved short circuit characteristics, lower system output harmonic wave and system cost.

The invention also provides a PWM controller which has a short circuit mode circuit in which input ends are simultaneously connected to a power supply input end and an output end of an output driving circuit. The PWM controller also has an oscillator which includes a temperature compensation circuit adopting a medium value multi-transistor resistor of a negative temperature coefficient and a well resistor of a positive temperature coefficient.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 3:
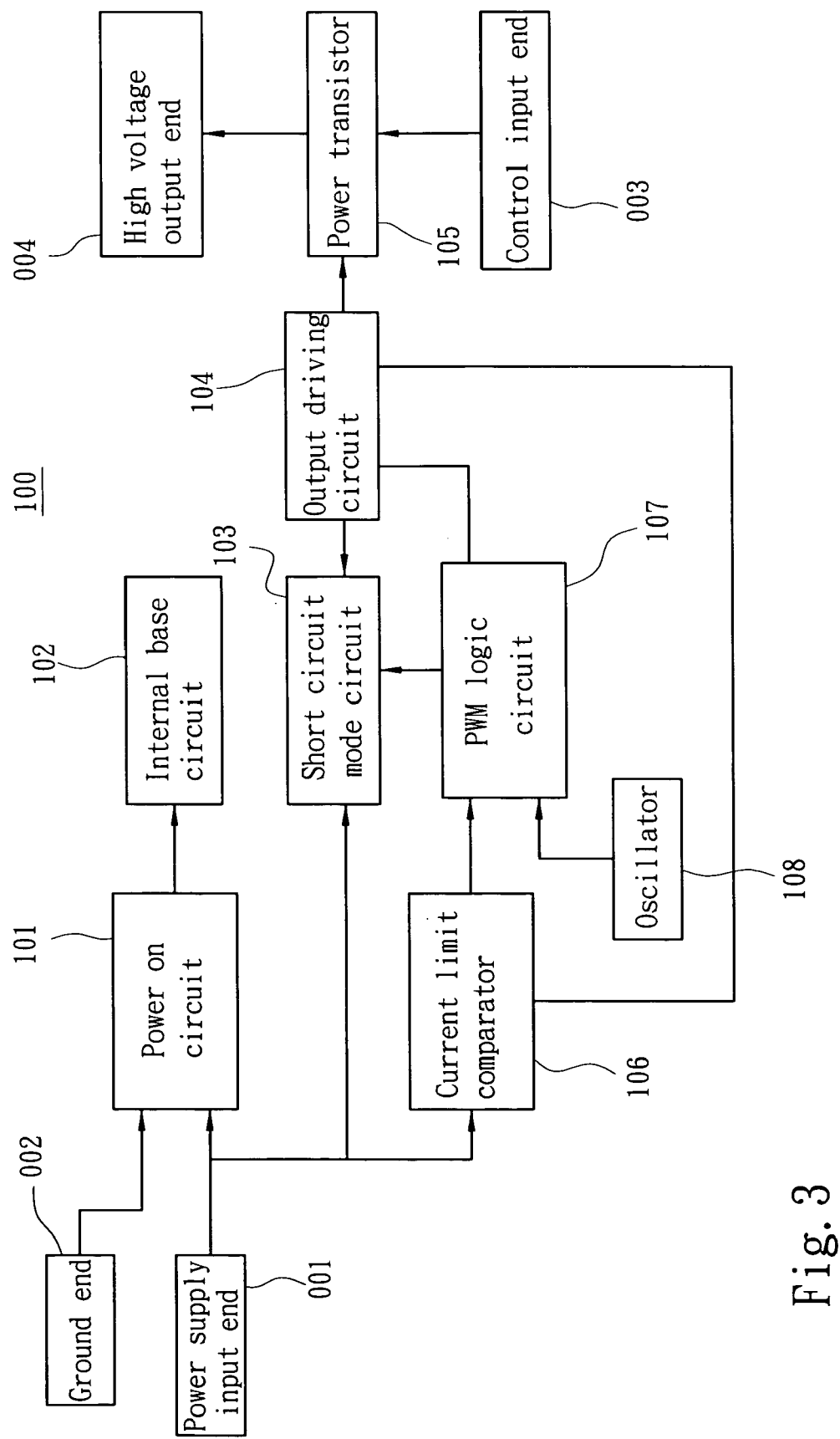
FIG. 3 is a circuit block diagram of an embodiment of the PWM controller of the invention.

Please refer to FIG. 3 for a circuit block diagram of an embodiment of a PWM controller 100 of the invention. It includes:

a power on circuit 101 which is connected to a power supply input end 001 and determines the interim threshold duty voltage of the power supply input end 001 at the power on stage and the minimum duty voltage during normal operation;

an oscillator 108 which generates a square wave signal at a constant frequency and has an output end connecting to a PWM logic circuit 107 and a positive and negative temperature compensation circuit to generate the constant frequency used by the power supply;

a current limit comparator 106 which has an input end connecting to the power supply input end 001 in response to a current sampling signal of an output driving circuit 104 to carry out feedback of a current circuit. The current limit comparator 106 also responds to voltage variations of the power supply input end 001 to carry out feedback of a voltage circuit. Current feedback signals and voltage feedback signals are sent to the PWM logic circuit 107 in an error signal format through the current limit comparator 106;

the PWM logic circuit 107 which is connected to the oscillator 108 to respond to the square wave signal output therefrom and also is connected to the current limit comparator 106 to receive the error signal thereof to determine the duty cycle of output driving pulse. The PWM logic circuit 107 further responds to input signals of a short circuit mode circuit 103 and periodically stops output signals to protect the system;

the short circuit mode circuit 103 which has one input end connecting to the power supply input end 001 and another input end connecting to an output end of the output driving circuit 104. During normal operation the voltage of the output end of the output driving circuit 104 is higher and the voltage of the power supply input end 001 is lower. In the event of short circuit or a light loading condition and the output end voltage of the output driving circuit 104 is lower, the voltage of the power supply input end 001 is higher, the short circuit mode circuit 103 makes the PWM controller 100 to enter a short circuit protection mode; and the output driving circuit 104 which has an input end connecting to the PWM logic circuit 107 and output ends connecting to the short circuit mode circuit 103 and the current limit comparator 106 to output the PWM pulse signals. It is connected to and drives a power transistor 105 outside the PWM pulse controller 100 through power elements located inside the PWM controller 100.

The power on circuit 101 may also be connected to an internal base circuit 102 to provide internal base signals.

Figure 4:
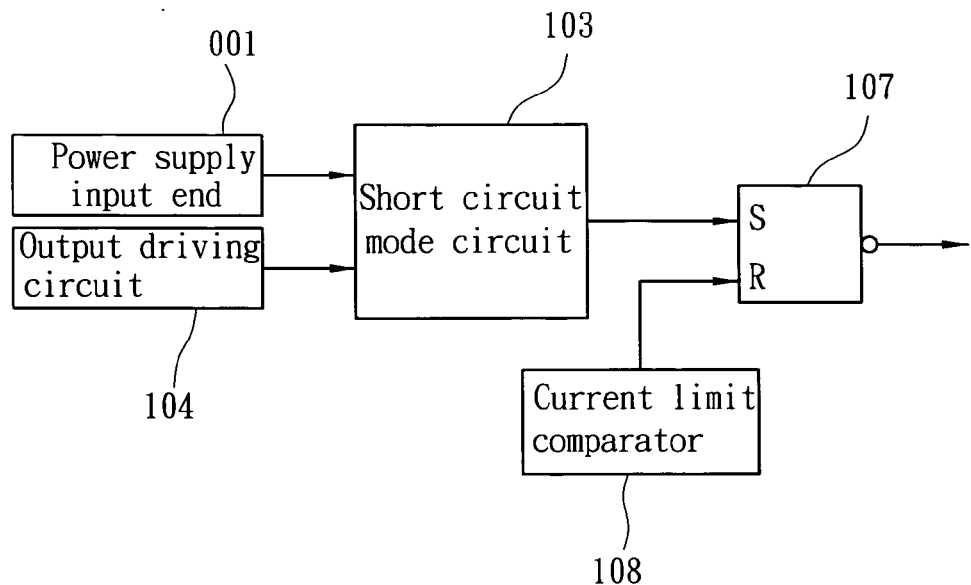
FIG. 4 is a fragmentary circuit block diagram of an embodiment of a short circuit mode circuit in the PWM controller of the invention.

As may be seen from the embodiment shown in FIG. 3, the PWM controller of the invention has features as follow: the input ends of the short circuit mode circuit 103 are connected simultaneously to the power supply input end 001 and the output end of the output driving circuit 104. Refer to FIG. 4 for a fragmentary circuit block diagram of an embodiment of the short circuit mode circuit 103. The short circuit mode circuit 103 of the PWM controller 100 of the invention adopts a control method different from the conventional PWM controller. The conventional PWM controller receives input signals merely from the output driving end, equivalent to the output driving circuit 104 of the invention, but does not receive the input signals at the same time from the power supply input end 001, hence response speed is slower and not accurate. By contrast, the short circuit mode circuit 103 of the invention is connected to the power supply input end 001 and the output end of the output driving circuit 104 at the same time, thus in normal operation condition the voltage at the output end of the output driving circuit 104 is higher, and the voltage at the power supply input end 001 is lower. In the event of short circuit or a light loading condition the voltage at the output end of the output driving circuit 104 is lower, and the voltage at the power supply input end 001 is higher. By means of such a design the system can enter the short circuit protection mode when short circuit occurs as previously discussed. It is to be noted that the PWM controller 100 does not enter the short circuit protection mode in the light loading condition.

Figure 5:
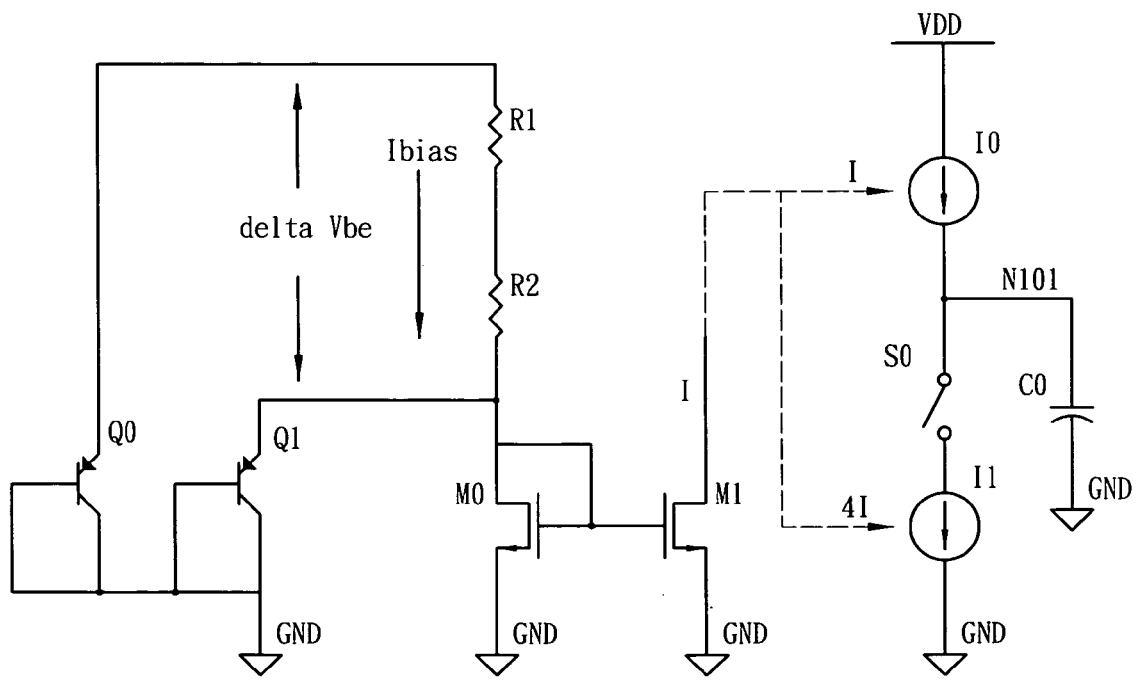
FIG. 5 is a fragmentary circuit diagram of an embodiment of a frequency temperature compensation circuit in an oscillator of the invention.

The temperature compensation circuit in the oscillator 108 of the PWM controller 100 of the invention adopts a medium value multi-transistor resistor of a negative temperature coefficient and a well resistor of a positive temperature coefficient. Refer to FIG. 5 for a fragmentary circuit diagram of the frequency temperature compensation circuit in the oscillator of an embodiment of the invention. The frequency of the oscillation circuit usually is determined by a capacitor C0 and power supplies I0 and I1. Current I flows into one power supply I0, and current 4I flows into another power supply I1. They are obtained through transistors M0 and MI and a mirror image bias current Jbias of other current mirror. In the general CMOS design the bias current Ibias is generated by applying a positive temperature coefficient ΔVbe (delta Vbe shown in the drawings) to resistors R1 and R2. As there is no temperature coefficient of a resistor that can exactly match the temperature coefficient of ΔVbe, the temperature characteristics of the current is not desirable, and frequency stability is affected. To get a desired positive temperature coefficient of ΔVbe, the oscillation circuit of the invention employs a medium value multi-transistor R1 of a negative temperature coefficient and a well resistor R2 of a positive coefficient to reduce the temperature coefficient of the bias current. The formula is as follow:

$$I\text{bias}=\Delta Vbe/(R2+R1).$$

The temperature coefficient is determined by the following formula:

$$\frac{\partial I\text{bias}}{\partial T} = \frac{1}{R1+R2}\frac{\partial \Delta Vbe}{\partial T} + \frac{-\Delta Vbe}{(R1+R2)^2}\frac{\partial R2}{\partial T} + \frac{-\Delta Vbe}{(R1+R2)^2}\frac{\partial R1}{\partial T}$$

Based on the above two formulas, it can be seen that as the temperature coefficient of R2 is greater, the sum of two previous items is negative. This results in a not desirable current temperature coefficient. By including the resistor R1 of a negative temperature coefficient, the total is approaching zero. Hence a desired current temperature coefficient that can meet requirements can be obtained. And the oscillation frequency of a greater temperature stability can be obtained.

The power elements inside the PWM controller 100 set forth above may be built-in power transistors. And the power transistor 105 and PWM controller 100 can be packaged in a single TO-94 to save space. Moreover, the power on circuit 101 in the PWM controller 100 of the invention does not include a voltage stabilization diode.

By means of the design previously discussed, the invention provides an improved PWM controller 100. A system adopting the invention does not need a voltage stabilization diode which now exists in many of the conventional techniques. It also provides improved short circuit protection characteristics over the conventional designs.

Figure 6:
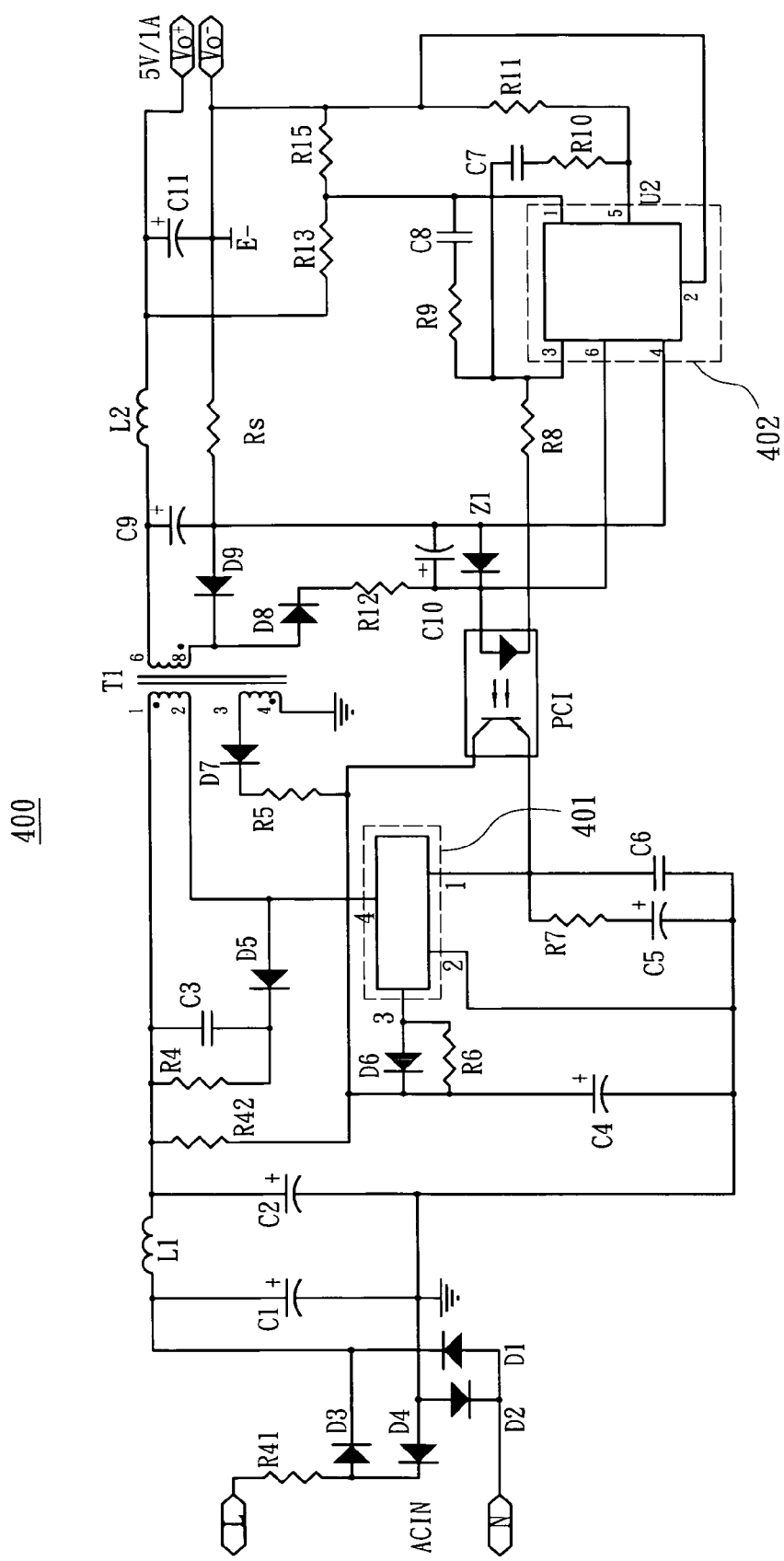
FIG. 6 is a circuit diagram of another embodiment of the charge circuit of the invention.
Figure 7:
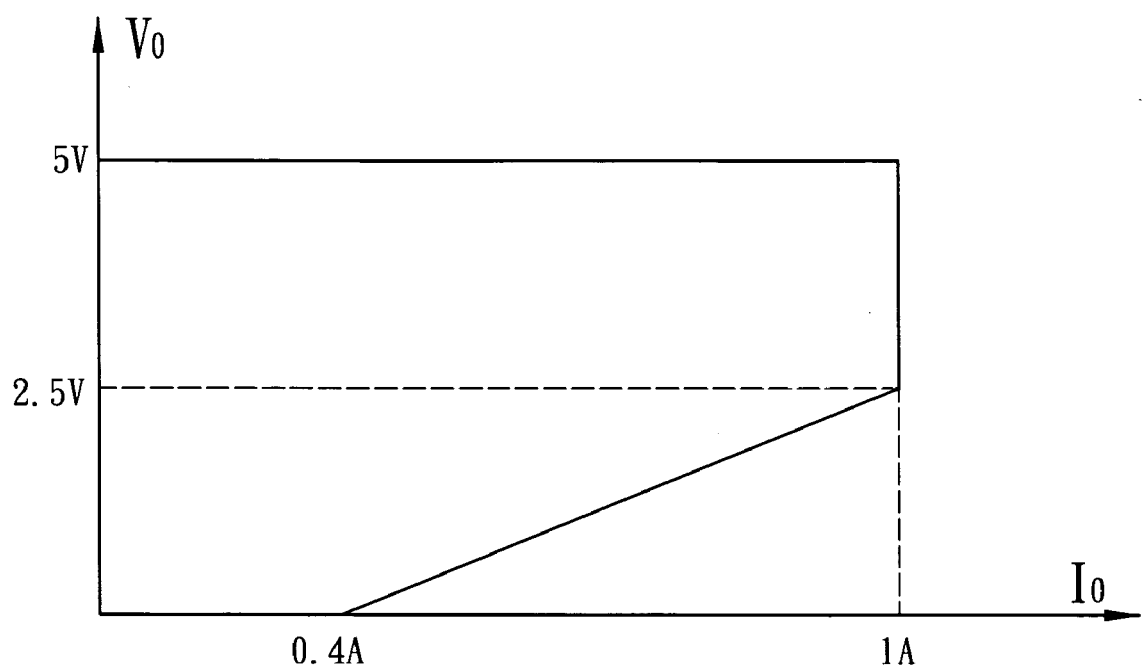
FIG. 7 is a chart showing a charging curve of another embodiment of the charge circuit of the invention.

Refer to FIG. 6 for the circuit diagram of another embodiment of the charger circuit of the invention. The charger circuit includes two portions, namely a PWM controller portion and a constant voltage/current control circuit portion that are coupled through a transformer T1. The PWM controller 401 shown in FIG. 6 is same as the PWM controller 100 in FIG. 3. It has pins sequence numbers 1-4 corresponding to input/output end numbers 001-004 in FIG. 3. It has a constant voltage/current control circuit marked by 402 in FIG. 6. The remaining elements are auxiliary elements. The operating principle of the charger circuit 400 is as follow: The voltage after rectification is sent to the PWM controller 401 through the transformer T1 to provide power on energy at the power supply input end of the PWM controller 401 to complete system power on process. In normal duty conditions, the auxiliary winding of the transformer T1 provides power supply energy for the PWM controller 401. A diode D8 is connected to a resistor R12 in series to provide required power for the constant voltage/current control circuit 402. Thus constant current characteristics can be maintained when output voltage is in the range of 2.5V-5V, and short circuit power is less than 1 watt. The harmonic wave also is lower in the no loading condition. Refer to FIG. 7 for the charging curve of the charger circuit 400. In this embodiment the constant voltage/current control circuit 402 can also provide short circuit control. Hence the charger circuit of the invention can get a very low output voltage harmonic wave in the no loading condition.

Figure 1:
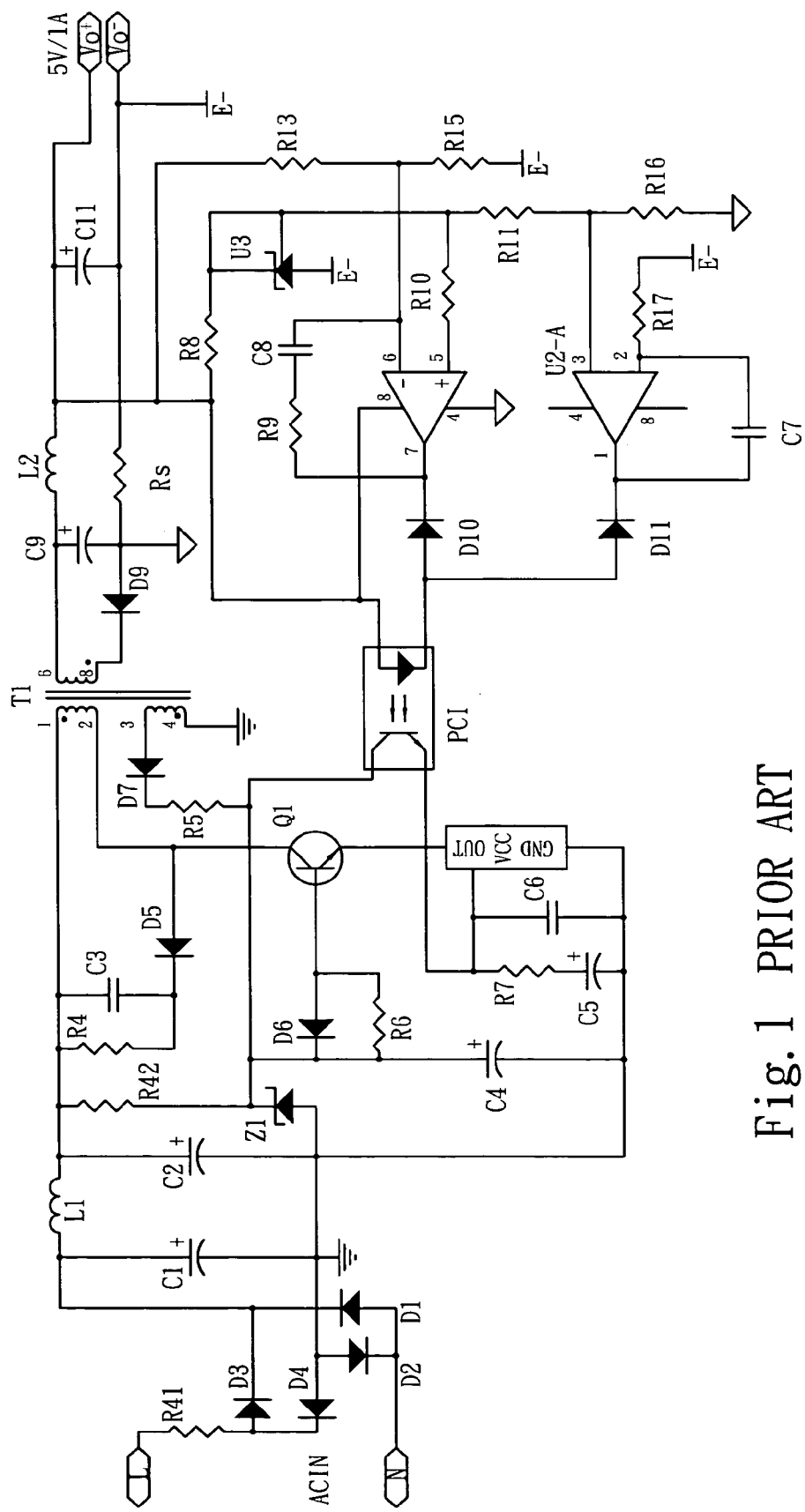
FIG. 1 is a circuit diagram of a conventional charger circuit in a PWM controller.

Referring to FIG. 1 for the circuit diagram of a charger circuit of a conventional PWM controller. It also has a PWM controller coupling with a constant voltage/current circuit through a transformer. However it differs from the invention as follow: The structure of the PWM controller is different and coupling of the auxiliary circuits also is different, and implementation of the constant voltage/current circuit also is different. The invention employs a core plate, while the conventional technique adopts a dual operational charge circuit. The embodiment shown in FIG. 1 is a conventional three-end PWM controller including a standard processing amplifier to achieve constant voltage and current.

Figure 2:
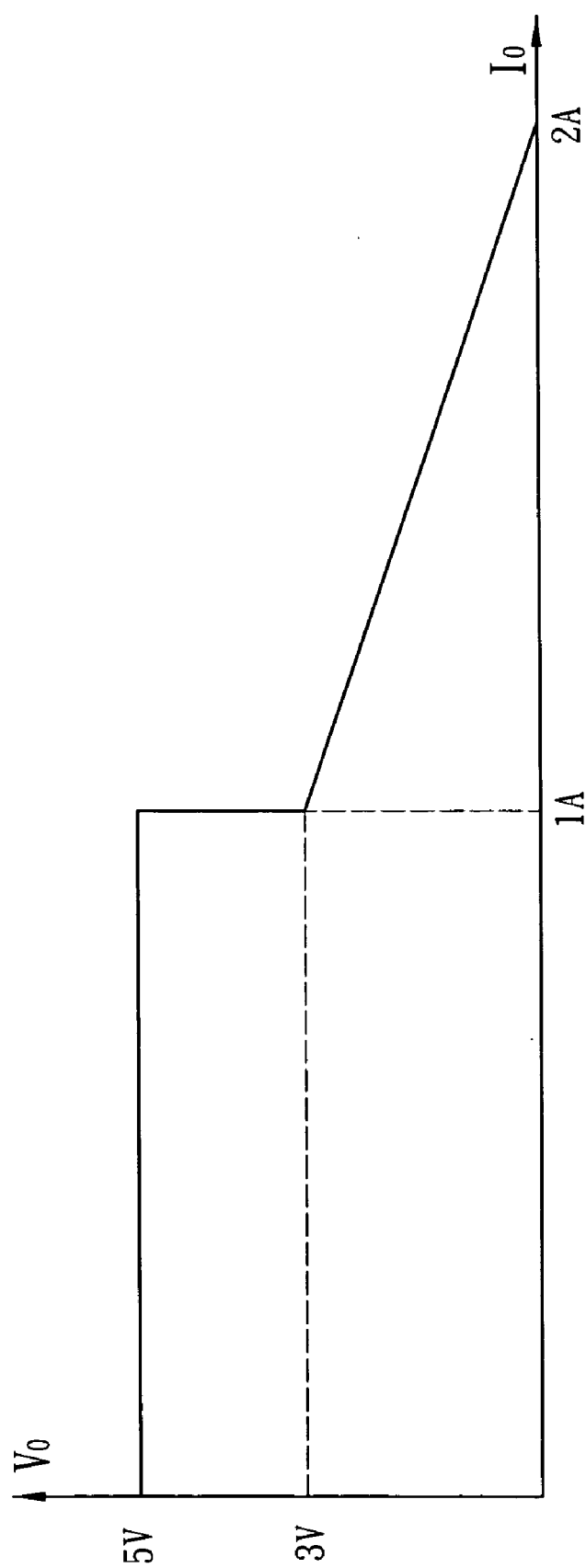
FIG. 2 is a chart showing a charging curve of a conventional charger circuit.

FIG. 2 depicts the charge curve of the charger circuit shown in FIG. 1. The charged circuit shown in FIG. 6 has disadvantages, namely the constant current range is narrower (3V-5V), and the charging curve is also less desirable, and short circuit current is greater (2A). Moreover, the system needs a great number of separated elements and the cost is higher.

In short, a system adopted the PWM control circuit and charger circuit 400 of the invention does not need a voltage stabilization diode that has to be used in many of the conventional designs. Short circuit protection characteristics are better than many of the existing designs. It adopts a novel approach to eliminate the low frequency harmonic wave. The power transistor and the controller can be packaged in a single TO-94, hence cluster density is enhanced. It overcomes the reliability problem occurred to the small package. The invention provides a high performance design at a lower cost that has a higher efficiency, improved short circuit characteristics and a lower system output harmonic wave.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A PWM controller, comprising the characteristic that a short circuit mode circuit has input ends connecting respectively and simultaneously to a power supply input end and an output end of an output driving circuit, and an oscillator which has a temperature compensation circuit which includes a medium value multi-transistor resistor of a negative temperature coefficient and a well resistor of a positive temperature coefficient.

2. The PWM controller of claim 1 further comprising:
   a power on circuit which is connected to the power supply input end and determines an interim threshold duty voltage of the power supply input end at the power on stage and a minimum duty voltage during normal operation;
   the oscillator which generates a square wave signal at a constant frequency and has an output end connecting to a PWM logic circuit and a positive and negative temperature compensation circuit to generate the constant frequency used by a power supply;
   a current limit comparator which has an input end connecting to the power supply input end in response to a current sampling signal of the output driving circuit to carry out feedback of a current circuit, and responds to voltage variations of the power supply input end to carry out feedback of a voltage circuit, current feedback signals and voltage feedback signals being sent to the PWM logic circuit in an error signal format through the current limit comparator;
   the PWM logic circuit which is connected to the oscillator to respond to the square wave signal output therefrom and is connected to the current limit comparator to receive error signals thereof to determine duty cycle of output driving pulses, and responds to input signals of the short circuit mode circuit and periodically stops output signals to protect the system;
   the short circuit mode circuit which has one input end connecting to the power supply input end and another input end connecting to the output end of the output driving circuit; during the normal operation the voltage at the output end of the output driving circuit is higher and the voltage at the power supply input end is lower; in the event of short circuit or a light loading condition and the output end voltage of the output driving circuit is lower and the voltage at the power supply input end is higher; the short circuit mode circuit making the PWM controller to enter a short circuit protection mode; and
   the output driving circuit which has an input end connecting to the PWM logic circuit and output ends connecting to the short circuit mode circuit and the current limit comparator, and generates PWM pulse signals and is connected to and drives a power transistor outside the PWM controller through power elements located in the PWM controller.

3. The PWM controller of claim 2, wherein the power elements in the PWM controller are built-in power transistors.

4. The PWM controller of claim 2, wherein the power on circuit does not include a voltage stabilization diode.

5. A charger circuit comprising a PWM controller and a constant voltage and constant current control circuit coupled with the PWM controller through a transformer, wherein:
   the PWM controller has a short circuit mode circuit which has input ends connecting respectively and simultaneously to a power supply input end and an output end of an output driving circuit, and an oscillator which has a temperature compensation circuit which includes a medium value multi-transistor resistor of a negative temperature coefficient and a well resistor of a positive temperature coefficient.

6. The charger circuit of claim 5, wherein the PWM controller includes:
   a power on circuit which is connected to the power supply input end and determines an interim threshold duty voltage of the power supply input end at the power on stage and a minimum duty voltage during normal operation;
   the oscillator which generates a square wave signal at a constant frequency and has an output end connecting to a PWM logic circuit and a positive and negative temperature compensation circuit to generate the constant frequency used by a power supply;
   a current limit comparator which has an input end connecting to the power supply input end in response to a current sampling signal of the output driving circuit to carry out feedback of a current circuit, and responds to voltage variations of the power supply input end to carry out feedback of a voltage circuit, current feedback signals and voltage feedback signals being sent to the PWM logic circuit in an error signal format through the current limit comparator;
   the PWM logic circuit which is connected to the oscillator to respond to the square wave signal output therefrom and is connected to the current limit comparator to receive error signals thereof to determine duty cycle of output driving pulses, and responds to input signals of the short circuit mode circuit and periodically stops output signals to protect the system;
   the short circuit mode circuit which has one input end connecting to the power supply input end and another input end connecting to the output end of the output driving circuit; during the normal operation the voltage at the output end of the output driving circuit is higher and the voltage at the power supply input end is lower; in the event of short circuit or a light loading condition and the output end voltage of the output driving circuit is lower and the voltage at the power supply input end is higher; the short circuit mode circuit making the PWM controller to enter a short circuit protection mode; and
   the output driving circuit which has an input end connecting to the PWM logic circuit and output ends connecting to the short circuit mode circuit and the current limit comparator, and generates PWM pulse signals and is connected to and drives a power transistor outside the PWM controller through power elements located in the PWM controller.

7. The charger circuit of claim 6, wherein the power elements in the PWM controller are built-in power transistors.

8. The charger circuit of claim 7, wherein the power on circuit does not include a voltage stabilization diode.

9. The charger circuit of claim 8, wherein the constant voltage and constant current control circuit provides short circuit control.

* * * * *